P. ROUSSILLON.
APPARATUS FOR VULCANIZING TIRES.
APPLICATION FILED MAY 6, 1912.
1,039,323.
Patented Sept. 24, 1912.
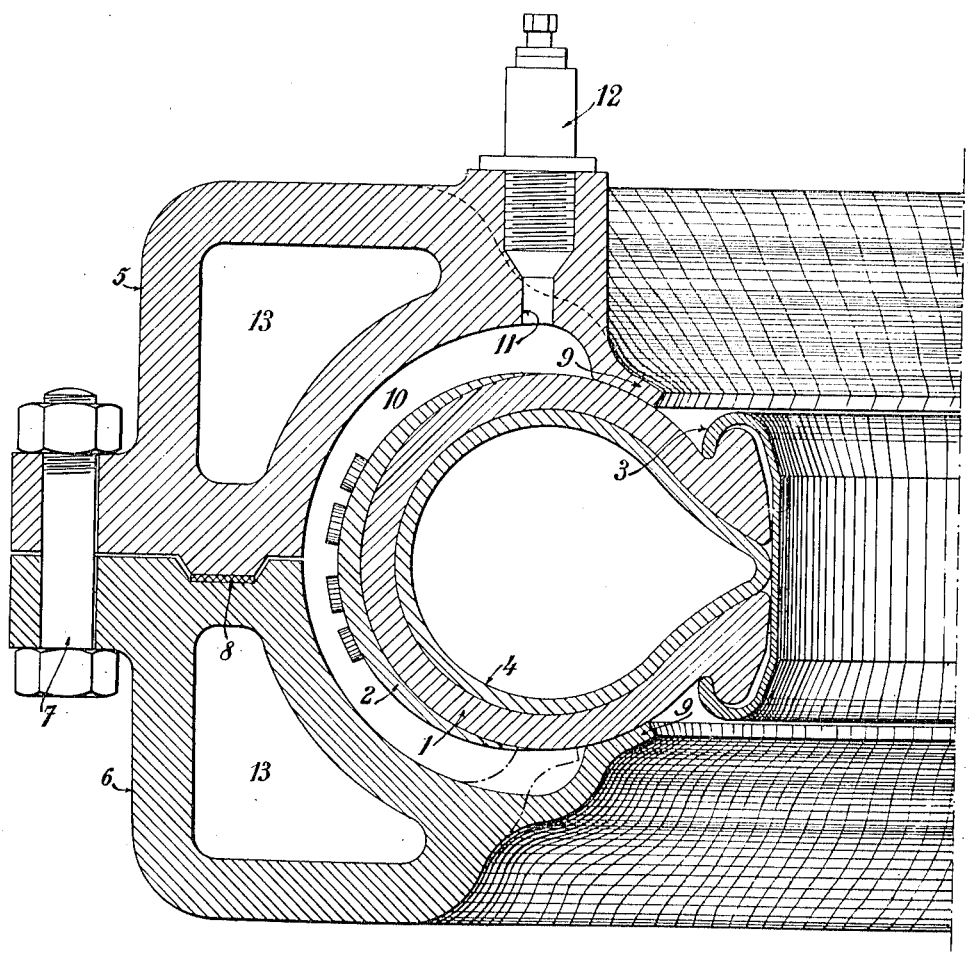

UNITED STATES PATENT OFFICE.

PHILIPPE ROUSSILLON, OF ARGENTEUIL, FRANCE, ASSIGNOR TO SOCIÉTÉ A. OLIER & CIE., OF CLERMONT-FERRAND, FRANCE.

APPARATUS FOR VULCANIZING TIRES.

1,039,323.  Specification of Letters Patent. Patented Sept. 24, 1912.

Application filed May 6, 1912. Serial No. 695,392.

*To all whom it may concern:*

Be it known that I, PHILIPPE ROUSSILLON, citizen of the Republic of France, residing at 14 Rue du Pérouzet, Argenteuil, Seine-et-Oise, in the Republic of France, have invented new and useful Improvements in Apparatus for Vulcanizing Tires, of which the following is a specification.

This invention relates to an apparatus for vulcanizing the tread on pneumatic tire covers which comprises a mold in two parts provided with inner passages for the heating medium. Said mold extends around the outer zone of the tire cover only and each of its parts is provided with an annular projecting rib so that the tire placed in the mold comes into contact with said ribs only whereby an inner free space is left in the mold around the tread, which space may be filled with compressed air so that the tread will be tightly forced against the tire during vulcanization, the compressed air acting simultaneously for transmitting heat from the mold to the tread and outer zone of the cover.

The annexed drawing shows by way of example an apparatus made according to the invention, with a tire in position to be vulcanized.

The tread 2 is cemented upon the tire cover 1 by means of a suitable solution and the latter is mounted upon a rim 3 and provided with an ordinary air tube 4. For protecting said air tube from the vulcanizing heat, an asbestos lining may be inserted between said air tube and the cover. The whole is then inserted into a circular mold made of two parts 5, 6, secured together by bolts 7. A groove joint 8 may be provided between the two parts for the sake of tightness. Each of the mold parts is provided with a projecting annular flange 9 which is adapted to engage the side of the tire, the inner edge of said flange coming to a point near the edge of the tread 2. The inner wall of the mold is thus held at a distance from the tread and a free space 10 is left between the same. This space communicates through a conduit 11 with an ordinary air valve 12 or any other suitable means whereby the space 10 may be filled with compressed air. Both parts 5, 6, of the mold are provided with inner passages 13 into which the heating steam or other fluid may be admitted.

When the rim provided with the tire cover and tread has been inserted into the mold, the air tube is inflated to the normal pressure so that the tire is expanded and its sides are tightly forced against the annular flanges 9 of the mold whereby the space 10 between the mold and the tread is hermetically closed. Compressed air is then forced into the space 10 through the valve 12 and hole 11. The outer pressure thus created has for its effect to press the tread regularly and evenly upon the tire and the vulcanization is then effected by admitting steam into the inner passages 13 in the parts of the mold. The compressed air which serves to press the tread on the tire acts at the same time for transmitting heat from the heated wall of the mold to the tread during the operation. The cover is thus expanded during the vulcanization to a normal extent and the tread is pressed thereon at all points with an even pressure. Moreover the cover is only heated in its outer portion where this is necessary. The annular ribs 9 of the mold may be provided with a heat-insulating band for preventing any transmission of heat from said ribs to the inner part of the cover body. The annular ribs 9 can also be arranged so as to come into contact with the edges of the tread to prevent compressed air from penetrating between the tread and the tire.

Having now described my invention, what I claim as new and desire to secure by Letters Patent is:

In an apparatus for vulcanizing the tread on pneumatic tire covers, the combination of a mold in two parts, passages in said parts for the heating medium, annular projecting ribs on both parts of the mold, adapted to engage the side portions of the cover, so that a free space is left between the inner wall of the mold and the tread, means for admitting compressed air into said space and means for inflating the tire substantially as described and for the purpose set forth.

In testimony whereof I have signed my name to this specification in the presence of two subscribing witnesses.

PHILIPPE ROUSSILLON.

Witnesses:
 Louis Moses,
 H. C. Coxe.